(12) United States Patent
Honda et al.

(10) Patent No.: US 6,186,669 B1
(45) Date of Patent: Feb. 13, 2001

(54) ROLLER CAGE FOR ROLLER BEARING

(75) Inventors: Akiyoshi Honda; Masahide Matsubara; Kunio Fukuda; Hiroyuki Sawai; Toshiyuki Suzuki; Akiyoshi Yamaguchi, all of Kanagawa (JP)

(73) Assignee: NSK Ltd., Kanagawa (JP)

( * ) Notice: Under 35 U.S.C. 154(b), the term of this patent shall be extended for 0 days.

(21) Appl. No.: 09/324,056

(22) Filed: Jun. 2, 1999

(30) Foreign Application Priority Data

Jun. 4, 1998 (JP) ................................................. 10-156205

(51) Int. Cl.[7] ...................................................... F16C 33/41
(52) U.S. Cl. .............................................................. 384/580
(58) Field of Search ...................................... 384/580, 572

(56) References Cited

U.S. PATENT DOCUMENTS

| | | | |
|---|---|---|---|
| 3,582,165 | * 6/1971 | Koch | 384/580 |
| 3,598,459 | * 8/1971 | Vannest | 384/580 |
| 5,328,277 | * 7/1994 | Moulton | 384/572 |
| 5,816,713 | * 10/1998 | Prock et al. | 384/580 |

FOREIGN PATENT DOCUMENTS

| | | | |
|---|---|---|---|
| 2 320 901 | 11/1973 | (DE) | F16C/33/54 |
| 44 36 478 | 4/1995 | (DE) | F16C/23/08 |
| 196 15 916 | 7/1998 | (DE) | F16C/23/08 |
| 5-157116 | 6/1993 | (JP) | F16C/33/48 |
| 8-28576 | 2/1996 | (JP) | F16C/33/48 |

* cited by examiner

Primary Examiner—Dirk Wright
(74) Attorney, Agent, or Firm—Sughrue, Mion, Zinn, Macpeak & Seas, PLLC

(57) ABSTRACT

A roller cage made of metal for holding rollers of a roller bearing, includes: separation bars separately defining a plurality of window holes along a peripheral direction of the bearing with a constant interval thereamong. The window holes respectively receive said rollers therein. Each of the separation bars includes: a contact surface being formed by press-molding one of an outer diameter surface side end portion and an inner diameter surface side end portion thereof, and contacting with the rolling surface of the roller; and an expansion portion expanding to a radial direction of the bearing at the other of the outer diameter surface side end portion and the inner diameter surface side end portion which is not subjected to the press-molding.

12 Claims, 10 Drawing Sheets

ROLLER CAGE FOR ROLLER BEARING

BACKGROUND OF THE INVENTION

1. Field of the Invention

The present invention relates to a roller cage made of metal for holding a roller of a roller bearing and, more particularly, relates to the technique for, at the time of press-molding a contact surface contacting to the rolling surface of the roller at the peripheral portion of a window hole for receiving the roller, performing the press-molding so as not to degrade the accuracy of the size of the roller cage.

2. Description of the Related Art

Conventionally, various types of roller bearings have been employed, and some of them employ a roller cage which is formed by press-molding a metal plate of steel plate or the like.

An example of such a roller cage made of metal will be explained with reference to FIG. 11. A roller cage 1 includes a plurality of window holes 2 for receiving a plurality of rollers respectively, a pair of front and rear flange portions 3, 4 for sandwiching the window holes 2 along the direction of the rotational axis of the roller bearing, and a plurality of separation bars 5 for separating the window holes along the rotational direction of the roller bearing. The roller cage 1 serves to hold a plurality of rollers 8, which roll while being in contact with an inner ring 6 and an outer ring 7 of the roller bearing, along the rotational direction of the roller bearing with a constant interval thereamong, as shown in FIG. 12.

As shown in FIG. 12, each of the separation bars 5 is provided with contact surfaces 9 contacting with the rolling surfaces of the adjacent rollers 8 at the peripheral portions of the adjacent window holes on the upper surface Sa side of the each separation bar 5. Each of the contact surfaces 9 is formed as schematically shown in FIG. 13 in a manner that the side surfaces 10, which are formed at the time of forming the corresponding one of window holes 2 by the stamp-molding process, are subjected to the press-molding by using a pressing die 11 and a backing (supporting) die 12 to press to the vertical direction in the figure thereby to form the contact surfaces. Accordingly, since the contact surfaces 9 can be made smooth, such a problem can be surely prevented that the abrasion is caused on the rolling surface of the roller 8.

At the time of subjecting the contact surfaces 9 of the roller cage 1 to the press-molding, the roller cage is pressed from a direction perpendicular to the axial direction thereof regardless of the type of the roller cage. When the pressing die 11 presses the upper surface side peripheral portions 10a of the window holes 2, portions (sectional areas) shown by a symbol S0 in FIG. 13 are pressed and simultaneously portions (sectional areas) shown by symbols S1 and S2 in FIG. 13 expand.

However, in the related press-molding method for the roller cage 1, since the backing die 12 supports the entirety of the lower surface Sb of the separation bar 5, the separation bar 5 can not be freely deformed at the time of the press-molding.

Thus, since the sum (S1+S2) of the increments of the sectional areas of the separation bar 5 is smaller than the decrement (S0) of the sectional area thereof, the separation bar 5 extends to an elongated direction of the separation bar in order to compensate the decrease of the sectional area. As a result, the accuracy of the size of the roller bearing degrades.

Thus, in the related art, in order to reduce the amount of the expansion of the separation bar 5 caused at the time of press-molding the contact surface 9, there have been employed such a method that the stroke of the pressing die 11 is reduced thereby to make the area of the contact surface 9 narrower, or that the size of the separation bar is set in view of the expansion of the separation bar 5. However, in each of such related methods, the number of required press-molding processes becomes quite large.

Further, in the related art, since it is difficult to manage the accuracy of the size of the roller cage, there has been a demand for the press-molding technique which can process a roller cage without degrading the accuracy of the size thereof.

SUMMARY OF THE INVENTION

In view of the above, an object of the present invention is to eliminate the aforesaid problems of the related art and to provide a roller cage which, at the time of press-molding a contact surface contacting to the rolling surface of a roller at the peripheral portion of a window hole for receiving the roller, can perform the press-molding so as not to degrade the accuracy of the size of the roller cage.

The aforesaid object of the present invention can be attained by the following roller cage made of metal for holding rollers of a roller bearing. The roller cage includes: separation bars separately defining a plurality of window holes along a peripheral direction of the bearing with a constant interval thereamong. The window holes respectively receive said rollers therein. Each of the separation bars includes: a contact surface being formed by press-molding one of an outer diameter surface side end portion and an inner diameter surface side end portion thereof, and contacting with the rolling surface of the roller; and an expansion portion expanding to a radial direction of the bearing at the other of the outer diameter surface side end portion and the inner diameter surface side end portion which is not subjected to the press-molding.

That is, according to the present invention, at the time of press-molding the contact surface contacting with the roller at the upper surface side peripheral portion of each of the window holes of the roller cage, one of the outer diameter surface side end portion and the inner diameter surface side end portion which is not subjected to the press-molding can be freely deformed to the pressing direction without being restricted by a backing die.

Accordingly, since the increase and the decrease of the sectional area of the roller cage can be made zero and the roller cage is prevented from extending to the elongated direction of the separation bar at the time of press-molding the contact surface, the contact surface can be formed at the roller cage by the mold-pressing so as not to degrade the accuracy of the size of the roller cage.

The press die used for fabricating the roller cage for the roller bearing according to the present invention includes a pressing die which press-molds the contact surface contacting with the rolling surface of the roller at the upper surface side peripheral portion of the window hole for receiving the roller of the roller cage, and a backing die which receives the lower surface of the roller cage in a state that the lower surface side peripheral portion of the window hole is floated thereby to hold the cage so that the lower surface side peripheral portion of the window hole can be deformed to the pressing direction.

Preferably, the backing die includes a projection portion which protrudes from the general surface not contacting with the pressing die and contacts with the lower surface of the roller cage, and slanted surfaces each of which extends between the projection portion and the general surface and receives the lower surface side peripheral portion of the window hole expanding to the backing die side.

That is, according to the press die of the present invention, when both the contacting width of the projection portion of the backing die contacting with the lower surface of the separation bar of the roller cage and the slanted angle of the slanted surfaces are set suitably, the amount of the sectional area of the separation bar which is reduced when the pressing die presses the upper surface side peripheral portion of the window hole can be made equal to the amount of the sectional areas of the separation bar which is increased due to the expansion of the lower surface side peripheral portion of the window hole to the backing die side, and the roller cage can be prevented from being extended to the elongated direction of the separation bar.

DETAILED DESCRIPTION OF THE PREFERRED EMBODIMENTS

A roller cage for a roller bearing, a fabricating method thereof and a pressing die used for fabricating the cage according to the embodiment of the present invention will be explained in detail with reference to FIGS. 1 to 10.

Figure 1:
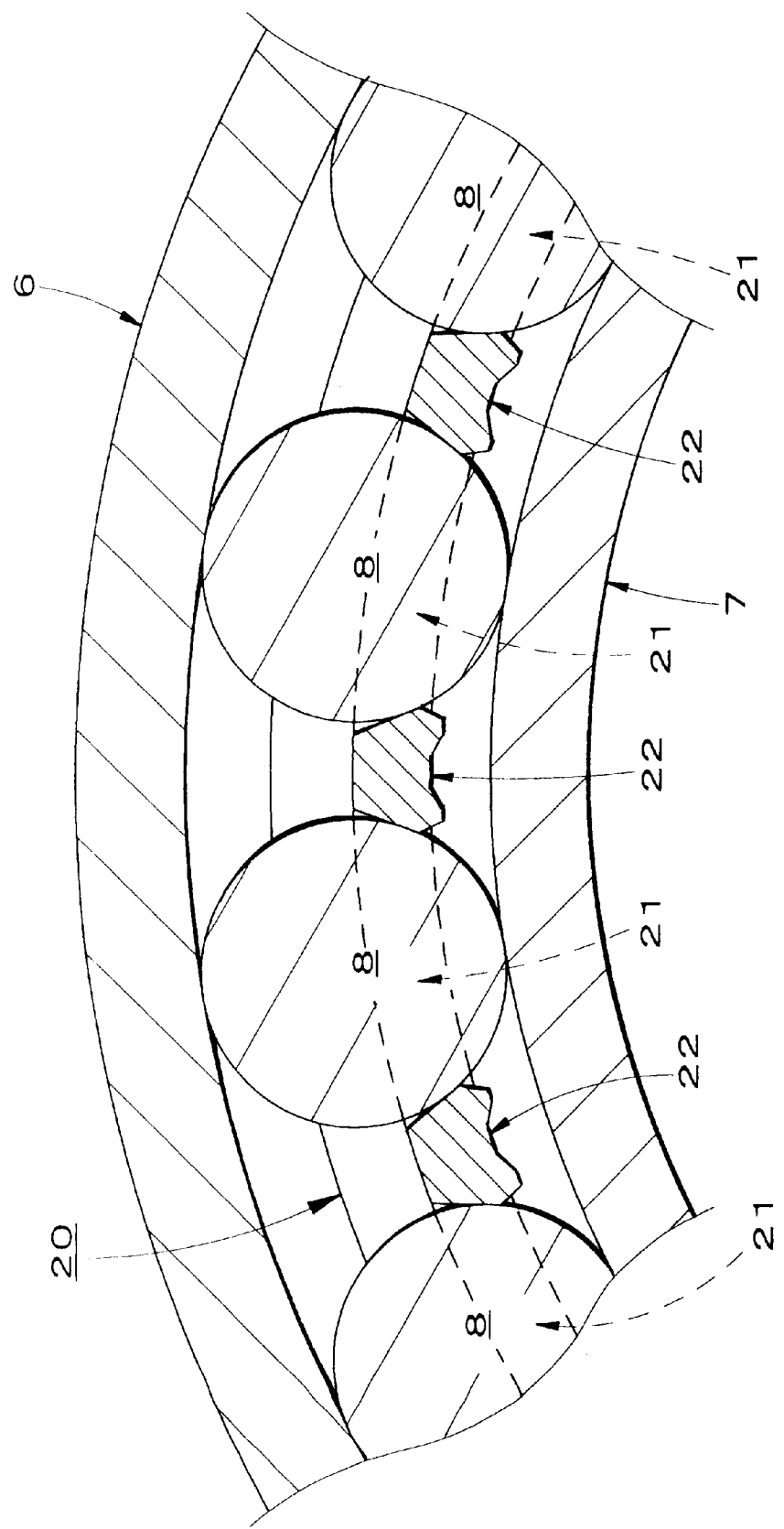
FIG. 1 is a sectional diagram showing a roller bearing in which a roller cage according to the first embodiment of the present invention is incorporated.
Figure 2:
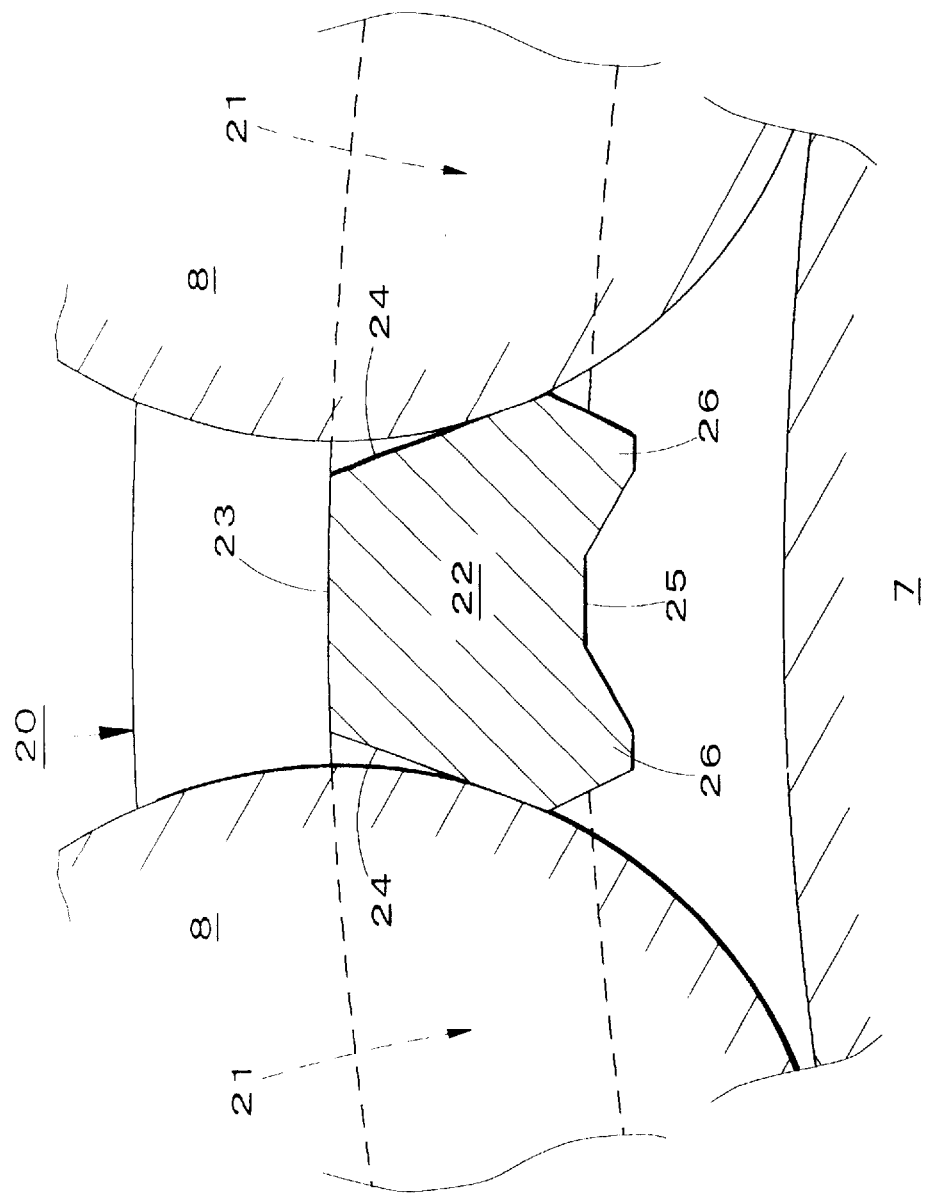
FIG. 2 is an enlarged sectional view showing a main portion of the roller cage shown in FIG. 1.
Figure 3:
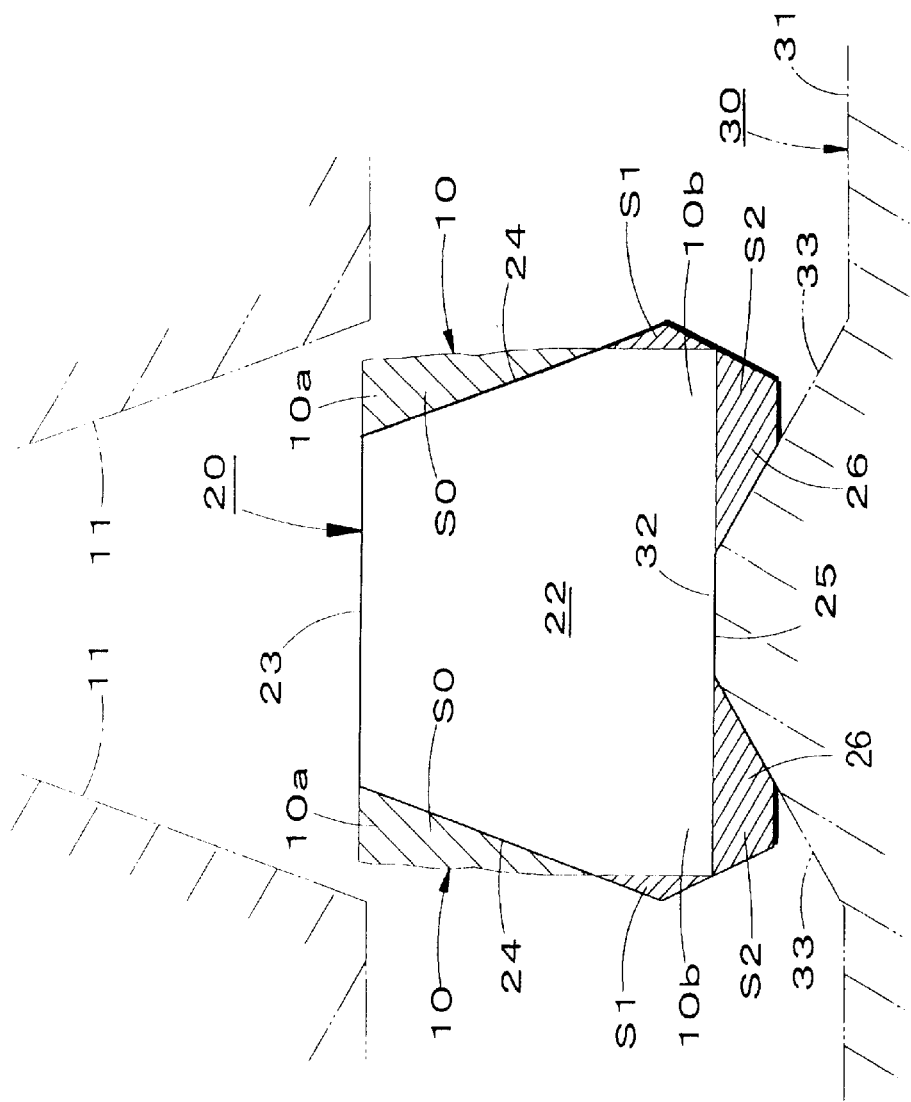
FIG. 3 is a schematic sectional diagram showing a method of fabricating the roller cage shown in FIG. 2.
Figure 4:
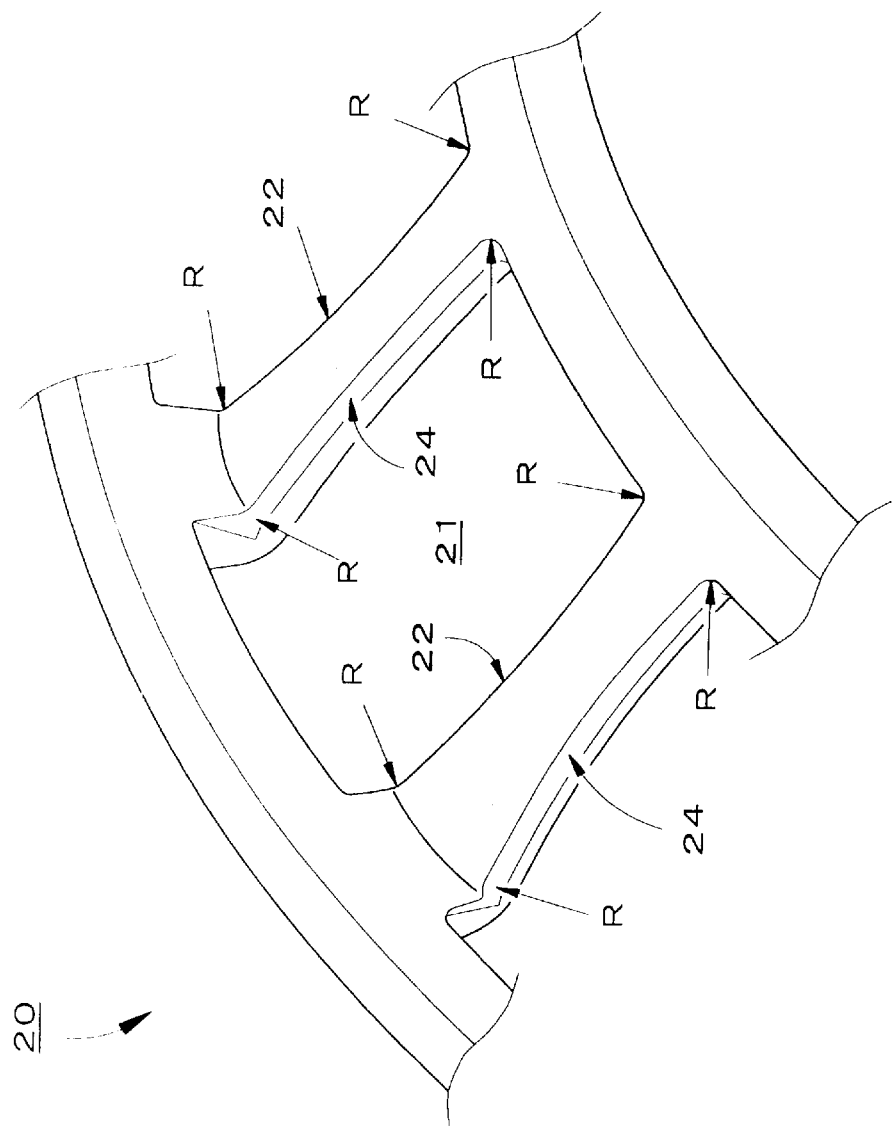
FIG. 4 is an enlarged perspective view showing a main portion of the roller cage shown in FIG. 1.
Figure 5:
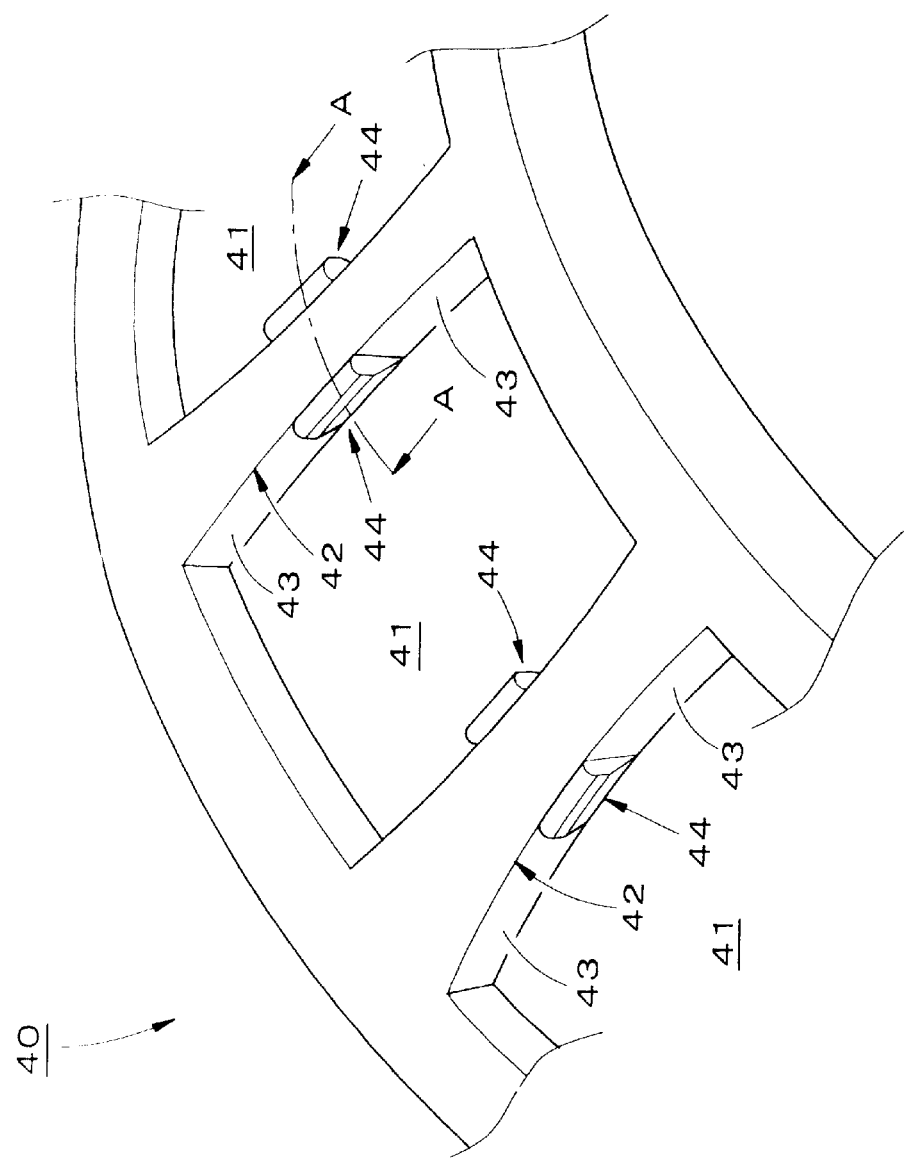
FIG. 5 is an enlarged perspective view showing a main portion of a roller cage according to the second embodiment of the present invention.
Figure 6:
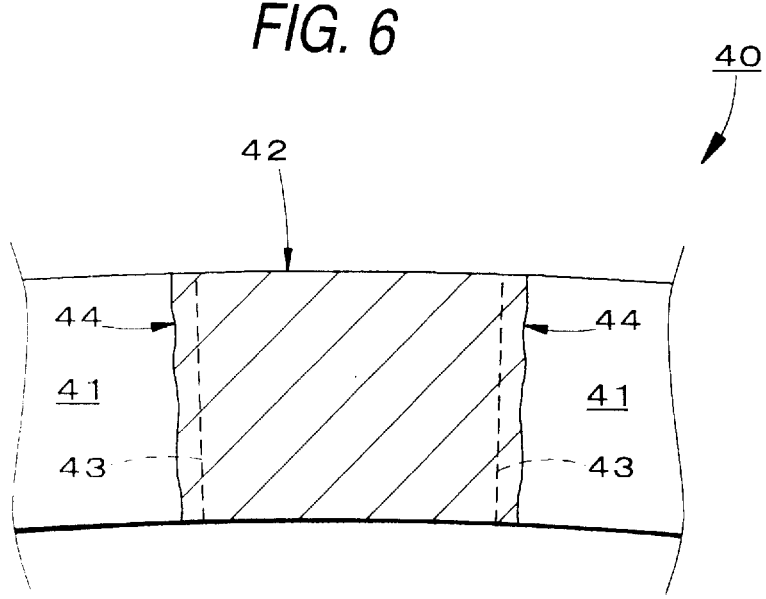
FIG. 6 is a sectional view showing a guide portion cut along a dot-and-dashed line A—A in FIG. 5.
Figure 7:
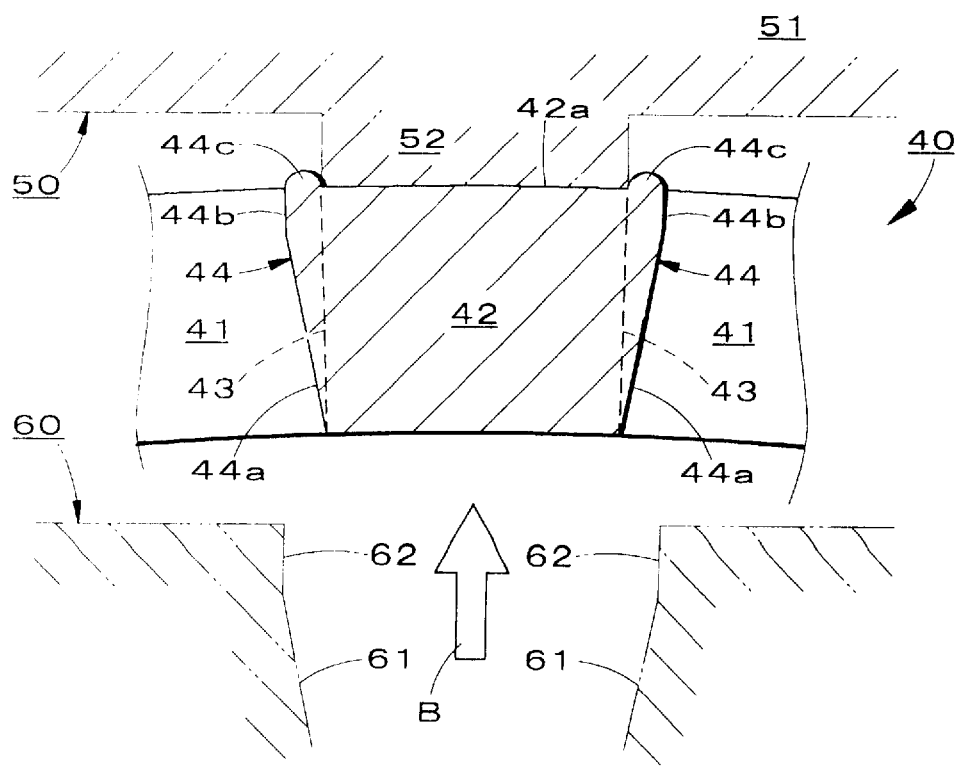
FIG. 7 is a sectional view schematically showing a method for fabricating a separation bar of the roller cage shown in FIG. 5.
Figure 8:
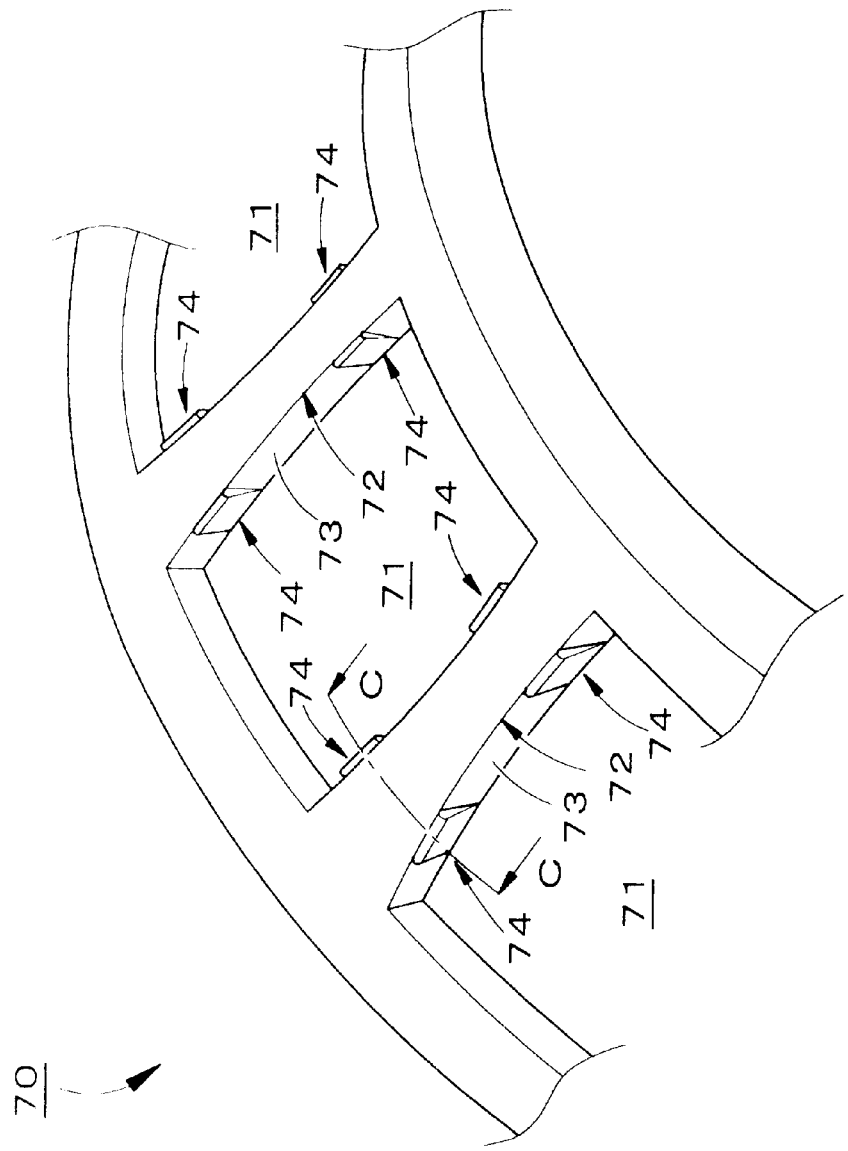
FIG. 8 is an enlarged perspective view showing a main portion of a roller cage according to the third embodiment of the present invention.
Figure 9:
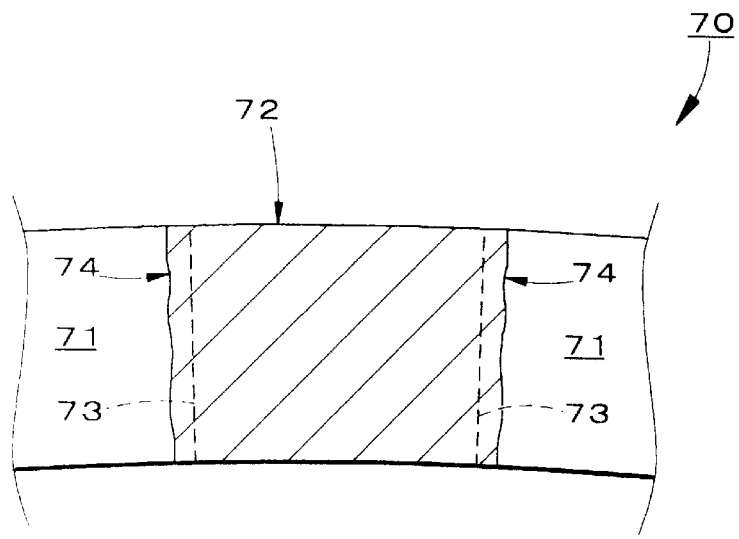
FIG. 9 is a sectional view showing a guide portion cut along a dot-and-dashed line C—C in FIG. 8.
Figure 10:
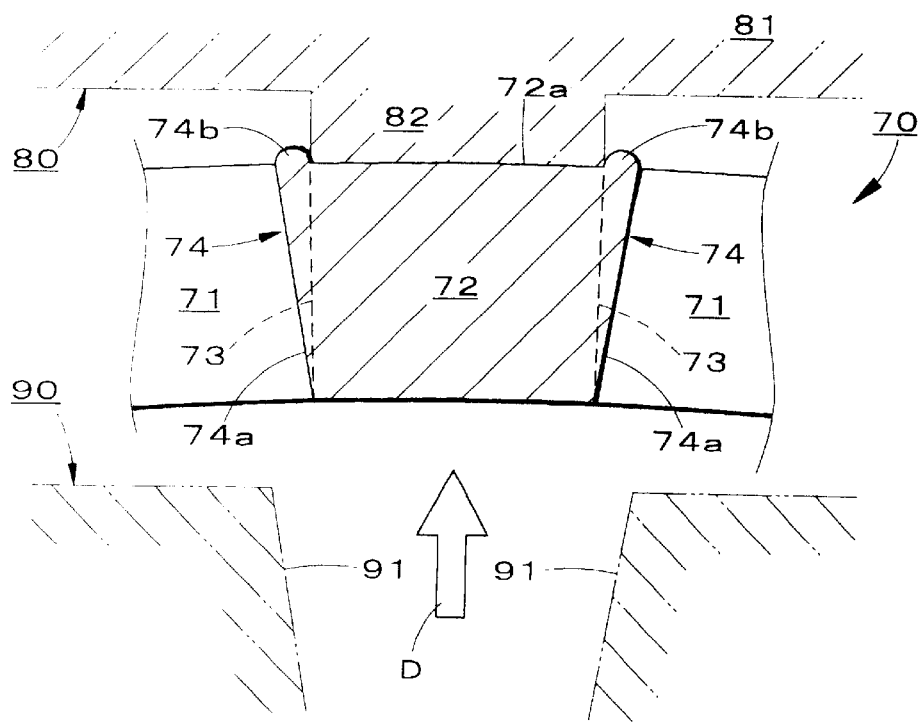
FIG. 10 is a sectional view schematically showing a method for fabricating a separation bar of the roller cage shown in FIG. 8.

FIG. 1 is a sectional diagram showing a roller bearing in which a roller cage according to the first embodiment of the present invention is incorporated. FIG. 2 is an enlarged sectional view showing a main portion of the roller cage shown in FIG. 1. FIG. 3 is a schematic sectional diagram showing a method of fabricating the roller cage shown in FIG. 2. FIG. 4 is an enlarged perspective view showing a main portion of the roller cage shown in FIG. 1. FIG. 5 is an enlarged perspective view showing a main portion of a roller cage according to the second embodiment of the present invention. FIG. 6 is a sectional view showing a guide portion cut along a dot-and-dashed line A—A in FIG. 5. FIG. 7 is a sectional view schematically showing a method for fabricating a separation bar of the roller cage shown in FIG. 5. FIG. 8 is an enlarged perspective view showing a main portion of a roller cage according to the third embodiment of the present invention. FIG. 9 is a sectional view showing a guide portion cut along a dot-and-dashed line C—C in FIG. 8. FIG. 10 is a sectional view schematically showing a method for fabricating a separation bar of the roller cage shown in FIG. 8.

In these figures, portions identical to those having been described are referred to by the common symbols and the explanation thereof will be simplified.

[First Embodiment]

A roller cage for a roller bearing and a fabricating method thereof according to the first embodiment of the present invention will be explained in detail with reference to FIGS. 1 to 4.

Figure 11:
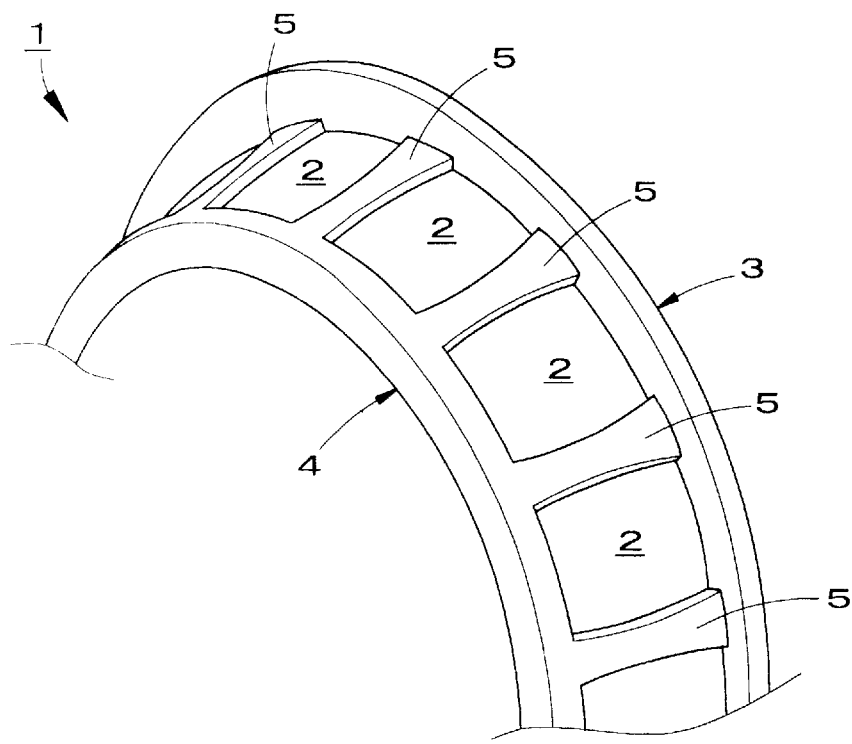
FIG. 11 is a perspective view showing a part of a related roller cage.
Figure 12:
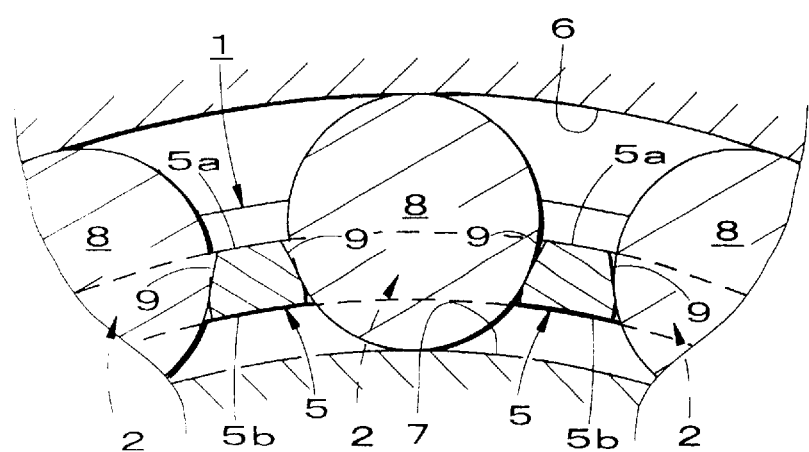
FIG. 12 is an enlarged sectional view showing a main portion of a roller bearing in which the roller cage shown in FIG. 11 is incorporated.
Figure 13:
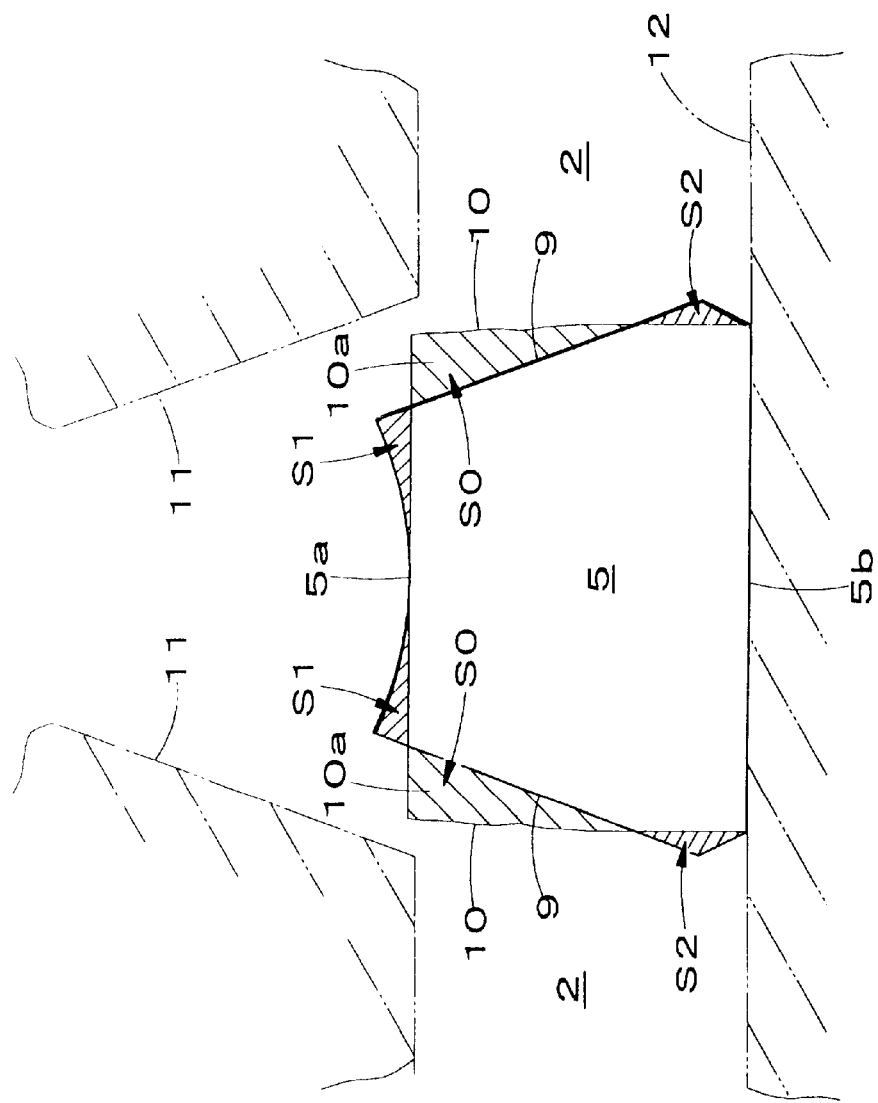
FIG. 13 is a schematic sectional diagram showing a method of fabricating the roller cage shown in FIG. 11.

As shown in FIG. 1, a roller cage 20 according to the first embodiment is arranged to receive a plurality of rollers 8, which roll while being in contact with an inner ring 6 and an outer ring 7 of the roller bearing, within window holes 21 respectively thereby to hold the rollers 8 along the rotational direction of the roller bearing with a constant interval thereamong. The roller cage 20 is fabricated by press-molding a metal plate such as a steel plate or the like. The entire configuration of the roller cage 20 is almost same as that of the related roller cage 1 shown in FIG. 11, but the sectional configuration of separation bars 22 thereof for separating a plurality of the window holes 21 along the rotational direction of the bearing differs from that of the related one.

That is, as shown in an enlarged diagram of FIG. 2, like the related roller cage 1, each of the separation bars 22 is provided by means of the press-molding with contact surfaces 24 contacting with the rolling surfaces of the adjacent rollers 8 at the peripheral portions of the adjacent window holes on the upper surface 23 side of the each separation bar 22.

In contrast, each of the separation bars is provided, at the peripheral portions of the adjacent window holes on the lower surface 25 side thereof, with expansion portions 26 which protrude from the general lower surface 25 of the roller cage 20 toward the inner side of the radial direction with respect to the rotation axis of the roller bearing. In this respect, the roller cage according to the embodiment differs from the related roller cage 1.

The procedure for press-molding the separation bars 22 of the roller cage 20 according to the embodiment will be explained with reference to FIG. 3.

As shown by thin solid lines in FIG. 3, at the stage where the window hole 21 has been formed by the stamp-molding process, the separation bar 22 has an almost rectangular sectional configuration, and cut surfaces generated at the time of forming the window hole 21 by the stamp-molding process remain at the portions on the upper surface 23 side of a pair of left and right side surfaces 10 facing on the adjacent window holes 21. Thus, when the upper surface side peripheral portions 10a of the window holes 21 are subjected to the press-molding by using the pressing die 11, the cut surfaces are smoothed and the contact surfaces 24 are formed.

In this case, the contact surfaces 24 are press-molded in a state that a backing die 30 receives or supports only the center portion along the width direction (horizontal direction of the figure) of the lower surface 25 of the separation bar 22 and the lower surface side peripheral portions 10b of the window hole 21 are separated or floated from the backing die 30.

To this end, the backing die 30 includes a projection portion 32, which protrudes from a general surface 31 not contacting with the lower end surface of the pressing die 11 toward the pressing die 11 side and receives the center portion along the width direction of the lower surface 25 of the separation bar 22, and a pair of left and right slanted surfaces 33 which couple the tip portion of the projection portion 32 with the general surfaces 31.

According to such an arrangement, at the time of press-molding the contact surfaces 24 on the separation bar 22, when the pressing die 11 presses the separation bar 22 to the backing die 30 side, the sectional configuration of the separation bar 22 is deformed and the lower surface side peripheral portions 10b of the separation bar 22 can be freely deformed to the pressing direction, that is, toward the backing die 30. Thus, the lower surface side peripheral portions 10b of the separation bar 22 expand toward the backing die 30 side and then pressed by the slanted surfaces 33, whereby the pair of left and right expansion portions 26 are formed.

In this case, both the contacting width of the projection portion 32 of the backing die 30 contacting with the lower surface 25 of the separation bar 22 and the slanted angle of the slanted surfaces 33 are set suitably so that the sectional area S0 of the separation bar 22 which is reduced when the pressing die 11 presses the upper surface side peripheral portions 10a of the window hole 21 becomes equal to the sum (S1+S2) of the sectional areas of the separation bar 22 which is increased due to the expansion of the separation bar 22 resulted from the deformation thereof.

As a consequence, since the total amount of the increase and the decrease of the sectional area of the separation bar 22 caused at the time of press-molding the contact surface 24 becomes zero, the separation bar 22 does not extend to the elongated direction of the separation bar.

Thus, according to the method for fabricating the roller cage 20 of the first embodiment, the contact surfaces 24 can be press-molded on the separation bar 22 without degrading the accuracy of the size of the roller cage 20.

That is, according to the method for fabricating the roller cage of the first embodiment, at the time of press-molding the contact surfaces 24 contacting with the rollers 8 at the upper surface side peripheral portions 10a of the window hole 21 of the roller cage 20, the lower surface side peripheral portions 10b of the window hole 21 can be freely deformed to the pressing direction without being restricted by the backing die 30.

As a consequence, since the increase and the decrease of the sectional area of the separation bar 22 can be prevented at the time of press-molding the contact surface 24 and the separation bar 22 is prevented from being extend to the elongated direction of the separation bar, the contact surfaces 24 can be press-molded without degrading the accuracy of the size of the roller cage 20.

Further, since the sectional area of the separation bar 22 does not decrease at the time of press-molding the contact surfaces 24, the intensity and the rigidity of the roller cage 20 can be improved.

Further, according to the method for fabricating the roller cage of the first embodiment, since the contact surfaces 24 can be press-molded without extending the separation bar 22, a large area can be spared for each of the contact surface 24.

Thus, since it is possible to enlarge the area of the contact surfaces 24 thereby to improve the guiding property of the contact surfaces for guiding the rollers 8, the rotation function of the roller bearing can be improved. Further, since the contact pressure between the pressing die 11 and the contact surfaces 24 can be reduced, the life time of the dies used for the press-molding process of the contact surfaces 24 can be made longer.

In addition, since the separation bar 22 does not extend at the time of press-molding the contact surfaces 24, the press-molding process of the round portions R to be formed at the respective four corners of the window hole 21, shown in FIG. 4 can be performed simultaneously with the press-molding process of the contact surfaces 24.

That is, in the related art, since the separation bar 22 extends due to the press-molding process of the contact surfaces 24, the press-molding process of the round portions to be formed at the respective four corners of the window hole 21 must be performed separately as another process in a state where the press-molding process of the contact surfaces 24 has been completed and the length of the separation bar 22 has been decided.

In contrast, in the method for fabricating the roller cage of the first embodiment, since the separation bar 22 does not extend at the time of press-molding the contact surfaces 24, the press-molding process of the round portions to be formed at the respective four corners of the window hole can be performed simultaneously with the press-molding process of the contact surfaces 24.

As a consequence, since the number of the processes required for the press-molding can be reduced, the fabricating cost of the roller cage 20 can be reduced. Further, since the accuracy of the entire configuration of the window hole 21 can be improved, the guiding property of the separation bar for guiding the rollers 8 can be further improved.

[Second Embodiment]

A roller cage for a roller bearing according to the second embodiment of the present invention will be explained in detail with reference to FIGS. 5 to 7.

As shown in FIG. 5, a roller cage 40 according to the second embodiment is arranged to hold a plurality of not-shown rollers along the rotational direction of the roller bearing with a constant interval thereamong. The roller cage is fabricated by press-molding a metal plate such as a steel plate or the like.

Separation bars 42 separate a plurality of window holes 41, for respectively receiving a plurality of not-shown rollers therein, along the rotational direction of the bearing. Each of the separation bars 42 is provided with guide portions 44, each for contacting with and guiding a roller, at portions along the longitudinal direction of opposite side surfaces 43 thereof so as to protrude therefrom.

As shown in FIG. 7, a contact surface 44a is formed on each of the guide portions 44 in a manner that the contact surface is slanted toward the inner side of the roller cage 40 along the radial direction thereof.

The procedure for press-molding the guide portions 44 of the roller cage 40 according to the second embodiment will be explained with reference to FIGS. 6 and 7.

As shown in FIG. 6, the guide portion 44 is formed by the press-molding process at the same time where the window hole 41 is formed by the stamp-molding process. In this case, the surface of the guide portion 44 is in a broken state, that is, uneven like the side surface 43. Thus, as shown in FIG. 7, the guide portion 44 is subjected to the press-molding process by using a pressing die 60 and a backing die 50 thereby to form the contact surface 44a so as to have a smooth surface.

As shown in FIG. 7, the backing die 50 includes base portions 51 separately disposed at the outer sides along the radial direction with respect to the separation bar 42, and a projection portion 52 which protrudes from the surface of the base portion 51 toward the separation bar 42 and contacts with a surface 42a of the separation bar 42 provided on the outer side thereof (upper side in the figure) along the radial direction between a pair of left and right side surfaces 43, 43 forming the separation bar 42. The pressing die 60 includes a pair of left and right slanted surfaces 61, 61 forming the contact surfaces 44a of the guide portion 44, and a pair of left and right guide surfaces 62, 62 for guiding excessive portions 44b which deform toward the backing die 50 at the time of forming the contact surfaces 44a. Accordingly, as shown by an arrow B in FIG. 7, when the pressing die 60 is shifted toward the backing die 50 to the outer side along the radial direction (upper side in the figure), the slanted contact surfaces 44a of the guide portion 44 are formed and simultaneously the excessive portions 44b deform toward the backing die 50 to the outer side along the radial direction thereby to form expansion portions 44c.

Thus, according to the method for fabricating the roller cage of the second embodiment, at the time of forming the guide portion 44 on the separation bar 42 by the press-molding process, the portions 44b and 44c of the guide portion 44 can be freely deformed to the pressing direction (outer side along the radial direction) without being restricted by the backing die 50.

As a result, since the increase and the decrease of the sectional area of the separation bar 42 can be prevented at the time of press-molding the contact surface 44a and the separation bar 42 is prevented from being extended to the elongated direction of the separation bar, the guide portion 44 can be press-molded without degrading the accuracy of the size of the roller cage 40.

Further, since the roller cage 40 according to the second embodiment is arranged in a manner that the guide portion 44 is provided at the portion of the side surface 43 of the separation bar 42 so as to protrude therefrom and the contact surface 44a contacting with the roller is formed on the guide portion 44, the accuracy of the configuration of the separation bars 42 can be further improved as compared with the case where the contact surface 44a is formed on the entire surface of the separation bar 42.

[Third Embodiment]

A roller cage for a roller bearing according to the third embodiment of the present invention will be explained in detail with reference to FIGS. 8 to 10.

As shown in FIG. 8, a roller cage 70 according to the third embodiment is arranged to hold a plurality of not-shown rollers along the rotational direction of the roller bearing with a constant interval thereamong. The roller cage is fabricated by press-molding a metal plate such as a steel plate or the like.

Separation bars 72 separate a plurality of window holes 71, for respectively receiving a plurality of not-shown rollers therein, along the rotational direction of the bearing. Each of the separation bars 72 is provided with guide portions 74, 74, each for contacting with and guiding a roller, at two portions along the longitudinal direction of each of opposite side surfaces 73 thereof so as to protrude therefrom.

As shown in FIG. 10, a contact surface 74a is formed on each of the guide portions 74 in a manner that the contact surface is slanted toward the inner side of the roller cage 70 along the radial direction thereof.

The procedure for press-molding the guide portions 74 of the roller cage 70 according to the third embodiment will be explained with reference to FIGS. 9 and 10.

As shown in FIG. 9, the guide portion 74 is formed by the press-molding process at the same time where the window hole 71 is formed by the stamp-molding process. In this case, the surface of the guide portion 74 is in a broken state, that is, uneven like the side surface 73.

Thus, as shown in FIG. 10, the guide portion 74 is subjected to the press-molding process by using a pressing die 90 and a backing die 80 thereby to form the contact surface 74a so as to have a smooth surface.

As shown in FIG. 10, the backing die 80 includes base portions 81 separately disposed at the outer sides along the radial direction with respect to the separation bar 72, and a projection portion 82 which protrudes from the surface of the base portion 81 toward the separation bar 72 and contacts with a surface 72a of the separation bar 72 provided on the outer side thereof (upper side in the figure) along the radial direction between a pair of left and right side surfaces 73, 73 forming the separation bar 72. The pressing die 90 includes a pair of left and right slanted surfaces 91, 91 forming the contact surfaces 74a of the guide portion 74.

Accordingly, as shown by an arrow D in FIG. 10, when the pressing die 90 is shifted toward the backing die 80 to the outer side along the radial direction (upper side in the figure), the slanted contact surfaces 74a of the guide portion 74 are formed and simultaneously the excessive portions deform toward the backing die 80 to the outer side along the radial direction thereby to form expansion portions 74b.

Thus, according to the method for fabricating the roller cage of the third embodiment, at the time of forming the guide portion 74 on the separation bar 72 by the press-molding process, the portions of the guide portion 74 can be freely deformed to the pressing direction (outer side along the radial direction) without being restricted by the backing die 80.

As a result, since the increase and the decrease of the sectional area of the separation bar 72 can be prevented at the time of press-molding the contact surface 74a and the separation bar 72 is prevented from being extended to the elongated direction of the separation bar, the guide portion 74 can be press-molded without degrading the accuracy of the size of the roller cage 70.

Further, since the roller cage 70 according to the third embodiment is arranged in a manner that the pair of the guide portions 74 are provided at the portion of the side surface 73 of the separation bar 72 so as to protrude therefrom and the contact surface 74a contacting with the roller is formed on each of the guide portions 74, the accuracy of the configuration of the separation bars 72 can be further improved as compared with the case where the contact surface 74a is formed on the entire surface of the separation bar 72.

Furthermore, since four contact surfaces 74a are arranged to guide the roller at each of the window holes 71, the guiding property for guiding the rollers can be further improved. It goes without saying that the fabricating method according to the third embodiment is applicable to a cage having no guide portion 74 at the separation bar 72.

Although explanation has been made in detail as to the roller cage for the roller bearing, the fabricating method thereof and press dies used for fabricating the roller cage according to the respective embodiments of the present invention, it goes without saying that the present invention is not limited to those embodiments and various modifications may be made.

For example, although in the aforesaid respective embodiments, the explanation has been made as to the roller cage for a radial bearing, the present invention is not limited thereto and, in the concrete, may be applied to a bearing cage for a cylindrical roller bearing, a tapered roller bearing, a spherical roller bearing or the like. Further, of course, the present invention is applicable to a roller cage for an axial bearing.

As clear from the aforesaid explanation, according to the present invention, at the time of press-molding the contact surfaces contacting with the rollers at the peripheral portions of the window holes of the roller cage, each of the separation bars for separating the window holes along the rotational direction of the roller bearing is prevented from being reduced in its sectional area.

Thus, since the expansion of the separation bars caused at the time of forming the contact surfaces can be prevented, the accuracy of the size of the roller cage can be improved and further the number of processes required for the press-molding can be reduced.

Further, since the intensity and rigidity of the separation bars is improved, the intensity and rigidity of the roller cage can be improved entirely.

Furthermore, since the area of the contact surfaces can be made larger, the guiding property of the contact surfaces for guiding the rollers can be improved and so the rotation function of the roller bearing can be improved, and further the contact pressure between the pressing die and the contact surface can be reduced and so the life time of the dies used for the press-molding can be made longer.

The present disclosure relates to the subject matter contained in Japanese patent application No. Hei. 10-156205 filed on Jun. 4, 1998 which is expressly incorporated herein by reference in its entirety.

What is claimed is:

1. A roller cage made of metal for holding rollers of a roller bearing, comprising:

separation bars separately defining a plurality of window holes along a peripheral direction of the bearing with a constant interval thereamong, said window holes respectively receiving said rollers therein, each of said separation bars including:

a contact surface being formed by press-molding one of an outer diameter surface side end portion and an inner diameter surface side end portion thereof, and contacting with the rolling surface of said roller; and an expansion portion expanding to a radial direction of the bearing at the other of said outer diameter surface side end portion and said inner diameter surface side end portion which is not subjected to the press-molding.

2. A roller cage according to claim 1, wherein said expansion portion is simultaneously formed by the press-molding of said contact surface.

3. A roller cage according to claim 1, wherein said separation bar is deformed to maintain a constant sectional area when said press-molding is conducted.

4. A method for fabricating a roller cage for a roller bearing, said roller cage having separation bars separately defining a plurality of window holes along a peripheral direction of the bearing with a constant interval thereamong, each of said separation bars being formed in a substantially rectangular shape having an outer diameter surface and an inner diameter surface and a pair of side surfaces, said method comprising the steps of:

preparing a backing die and a pressing die, said backing die having a base portion and a projection portion, said projection portion having a supporting surface contactable with one of said outer diameter surface and said inner diameter surface, the width of said supporting surface being not more than that of said one of said outer diameter surface and said inner diameter surface, said pressing die having a pair of slanted surfaces slanted so as to spread toward a pressing direction of said pressing die;

disposing said separation bar on said backing die; and shifting said pressing die toward said backing die so as to press-mold said separation bars, whereby said separation bars is formed with a pair of contact surfaces deformed by said slanted surface of said pressing die and a pair of expansion portions expanding from said one of said outer diameter surface and said inner diameter surface toward the radial direction.

5. A method for fabricating a roller cage according to claim 4, wherein said contact surfaces and said expansion portions are simultaneously formed by the press-molding of said separation bar.

6. A method for fabricating a roller cage accroding to claim 4, wherein said backing die further includes a pair of slanted surfaces provided between said base portion and said projection portion.

7. A roller bearing comprising a cage made of metal which has separation pillars arranged with a constant interval along a peripheral direction of said roller bearing to define a plurality of window holes between them therealong, wherein each of said separation pillars is formed with an outer diameter side surface, an inner diameter side surface and a pair of side surfaces, wherein at least one contacting surface for contacting a roller element is formed at each of the two side surfaces, wherein at least one extending portion which extends at least in a radial direction of said bearing is formed at one of said diameter side surfaces of said separation pillar, and said extending portion is free of contact relative to the roller element which is guided by the abutting window hole.

8. The roller bearing according to claim 7, wherein the separation pillar has a constant sectional area.

9. The roller bearing according to claim 7, wherein rounded portions are formed at corners of neighboring window holes abutting said separation pillar.

10. The roller bearing according to claim 7, wherein the contacting surfaces at each of the two side surfaces of said separation pillar are formed over the entire axial length thereof.

11. The roller bearing according to claim 7, wherein the separation pillar comprises a substantially rectangular shape, and wherein in the middle of each of the two side surfaces of the separation pillar a contacting surface is formed which projects into the abutting window opening.

12. The roller bearing according to claim 7, wherein the separation pillar is formed in a substantially rectangular shaft, and wherein two or more contacting surfaces are formed at each of the two side surfaces of the separation pillar, and the contacting surfaces project into the abutting window opening.

* * * * *